W. W. CHAMBERS.
POULTRY FOUNTAIN.
APPLICATION FILED JULY 23, 1910.

987,551.

Patented Mar. 21, 1911.

WITNESSES
Jas. K. McCathran
J. H. Riley

W. W. Chambers, INVENTOR
BY
C. G. Siggers
ATTORNEY

UNITED STATES PATENT OFFICE.

WILLIAM W. CHAMBERS, OF DARLINGTON, INDIANA.

POULTRY-FOUNTAIN.

987,551.  Specification of Letters Patent. Patented Mar. 21, 1911.

Application filed July 23, 1910. Serial No. 573,465.

*To all whom it may concern:*

Be it known that I, WILLIAM W. CHAMBERS, a citizen of the United States, residing at Darlington, in the county of Montgomery and State of Indiana, have invented a new and useful Poultry-Fountain, of which the following is a specification.

The invention relates to improvements in poultry fountains.

The object of the present invention is to improve the construction of poultry fountains, and to provide a simple, strong and durable device of this character, designed particularly for watering chickens, and capable of maintaining a continuous supply of water in a sanitary condition and of automatically feeding the water as it is consumed by the poultry.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

Figure 1:
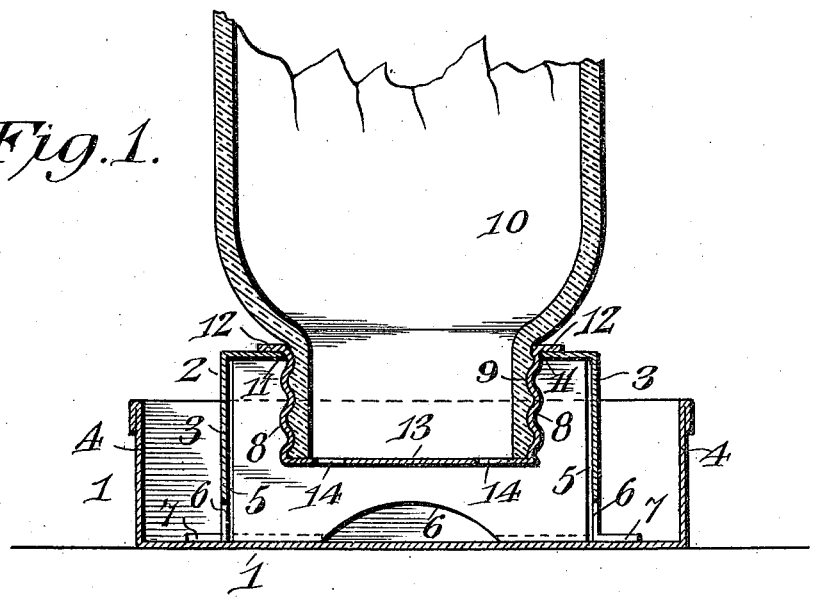
Figure 2:
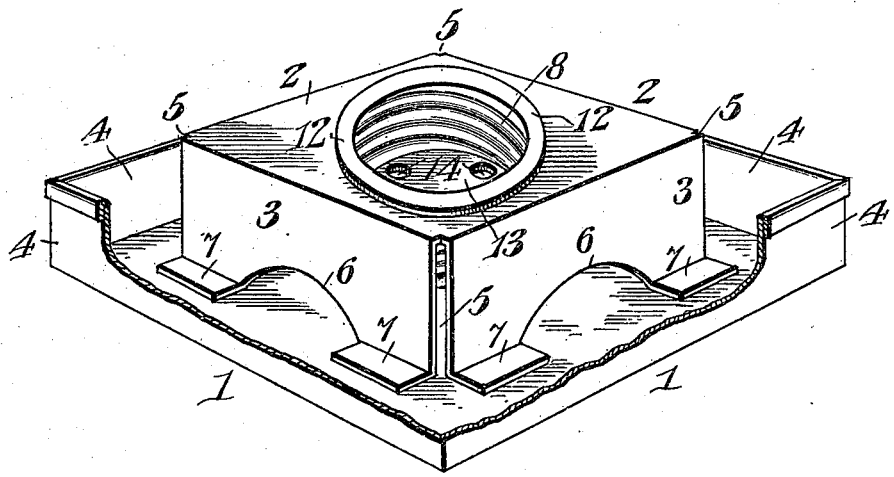

In the drawing:—Figure 1 is a vertical sectional view of a poultry fountain, constructed in accordance with this invention. Fig. 2 is a perspective view of the same, the jar or receptacle being removed and a portion of the wall of the pan being broken away.

Like numerals of reference designate corresponding parts in all the figures of the drawing.

In the embodiment of the invention illustrated in the accompanying drawing, the poultry fountain comprises in its construction a rectangular pan 1, and a rectangular support 2, consisting of a shell and arranged within the pan and composed of a horizontal top and vertical supporting walls 3, extending above the walls 4 of the pan, and spaced from the said walls 4 to form an outer marginal drinking trough. The vertical walls 3 of the support are preferably formed integral with the horizontal top in order that the support may be stamped or otherwise formed in a single piece of sheet metal, and the end edges of the walls 3 may be spaced from each other to provide corner openings 5 in addition to outlet openings 6. The outlet openings 6 are located at the lower edges of the walls 3 in spaced relation with the end portions of the same, which have outwardly extending horizontal attaching flanges 7. The attaching flanges 7 are arranged flat upon the upper face of the bottom of the pan 1 and are soldered or otherwise secured to the same.

The support 2 is equipped at the top with a central threaded socket 8, preferably consisting of an inverted screw cap and adapted to receive the threaded neck 9 of an ordinary Mason jar 10, but any other suitable receptacle, such as a sheet metal pan may be employed for holding the supply of water. Also the device may be constructed in various sizes to correspond to the usual sizes of Mason jars. The top of the support 2 is provided with a central opening 11 to receive the screw cap, which has an outwardly extending annular flange 12 to rest upon the support. The flange 12, which is horizontal, is soldered or otherwise secured to the top of the support, while the screw cap, which extends through the said opening 11, projects below the plane of the upper edges of the walls of the pan, and is arranged in spaced relation with the bottom thereof and is provided in its bottom portion 13 with a plurality of perforations 14 for the discharge of the contents of receptacle 10. The jar or receptacle 10 is filled with water and the device is screwed on the threaded neck of the receptacle, while the latter is in an upright position. The fountain is then inverted and as soon as the water within the device rises sufficiently to submerge the discharge openings 14, the water will cease to flow, but will be automatically supplied to the pan as fast as it is consumed by the chickens or other poultry.

Having thus fully described my invention, what I claim as new and desire to secure by Letters Patent, is:—

A poultry fountain comprising a pan having a bottom, and upwardly extending walls, a support consisting of an inner shell arranged within the pan and composed of a top having an opening, and supporting walls secured at their lower edges to the bottom of the pan and arranged in spaced relation with the walls of the pan to form an outer marginal drinking trough and having outlet openings communicating with the trough, and an inverted screw cap depending through the opening in the top of the support at a point below the plane of the upper edges of the walls of the pan and provided in its bottom with an outlet and having an outwardly extending projecting attaching flange at the top secured to the top of the support, the top of the screw cap being open to receive the threaded neck of a receptacle.

In testimony, that I claim the foregoing as my own, I have hereto affixed my signature in the presence of two witnesses.

WILLIAM W. CHAMBERS.

Witnesses:
 LORA N. BOOHER,
 N. A. BOOHER.

Copies of this patent may be obtained for five cents each, by addressing the "Commissioner of Patents Washington, D. C."